(12) United States Patent
Roux et al.

(10) Patent No.: US 11,117,455 B2
(45) Date of Patent: Sep. 14, 2021

(54) SEAL FOR A LOWERABLE WINDOW PANE OF A VEHICLE DOOR WINDOW

(71) Applicant: CQLT SAARGUMMI TECHNOLOGIES S.À.R.L., Remich (LU)

(72) Inventors: Sébastien Roux, St-Aubin-Celloville (FR); Philippe Sans, Luisant (FR)

(73) Assignee: CQLT SAARGUMMI TECHNOLOGIES S.À.R.L., Remich (LI)

( * ) Notice: Subject to any disclaimer, the term of this patent is extended or adjusted under 35 U.S.C. 154(b) by 211 days.

(21) Appl. No.: 16/305,145

(22) PCT Filed: Mar. 27, 2017

(86) PCT No.: PCT/EP2017/000372
§ 371 (c)(1),
(2) Date: Nov. 28, 2018

(87) PCT Pub. No.: WO2017/207076
PCT Pub. Date: Dec. 7, 2017

(65) Prior Publication Data
US 2020/0317036 A1    Oct. 8, 2020

(30) Foreign Application Priority Data
Jun. 3, 2016    (DE) ..................... 10 2016 110 276.8

(51) Int. Cl.
*B60J 10/76*    (2016.01)
*B60J 10/16*    (2016.01)
(Continued)

(52) U.S. Cl.
CPC ............... *B60J 10/76* (2016.02); *B60J 10/15* (2016.02); *B60J 10/16* (2016.02); *B60J 10/24* (2016.02); *B60J 10/32* (2016.02)

(58) Field of Classification Search
None
See application file for complete search history.

(56) References Cited

U.S. PATENT DOCUMENTS

| 4,417,419 A | * | 11/1983 | Rossie | ................... B60J 10/248 |
| | | | | 49/348 |
| 5,209,019 A | * | 5/1993 | Morita | ................... B60J 10/248 |
| | | | | 49/475.1 |

(Continued)

FOREIGN PATENT DOCUMENTS

| CN | 102105318 A | 6/2011 |
| DE | 3512973 A1 | 11/1985 |

(Continued)

OTHER PUBLICATIONS

English Translation of Chinese Office Action, Appl. No. 201780028384.X dated Jan. 6, 2021, 7 Pages.

(Continued)

*Primary Examiner* — Catherine A Kelly
(74) *Attorney, Agent, or Firm* — Lucas & Mercanti, LLP; Klaus P. Stoffel

(57) ABSTRACT

A seal between a frame part of a vehicle door window and the upper edge of a lowerable window pane of the vehicle door window. A seal profiled element of plastic is provided, which is slid onto a flange protruding upward from the frame part of the vehicle window and/or which is connected to a tube-shaped seal section for forming a seal between the frame part and a border surface of a door opening in a vehicle body.

14 Claims, 2 Drawing Sheets

(51) Int. Cl.
  *B60J 10/15* (2016.01)
  *B60J 10/24* (2016.01)
  *B60J 10/32* (2016.01)

(56) References Cited

U.S. PATENT DOCUMENTS

| | | | | |
|---|---|---|---|---|
| 5,317,835 | A | * | 6/1994 | Dupuy .................. B60J 10/235 49/377 |
| 5,493,814 | A | * | 2/1996 | Christian ............... B60J 10/233 49/479.1 |
| 5,548,929 | A | * | 8/1996 | Larsen ..................... B60J 10/22 24/297 |
| 5,743,047 | A | | 4/1998 | Bonne |
| 8,033,057 | B2 | * | 10/2011 | Krause .................. B60J 10/248 49/441 |
| 8,166,708 | B2 | * | 5/2012 | Ellis ........................ B60J 10/26 49/490.1 |
| 9,963,088 | B2 | * | 5/2018 | Yoshida ................ B60J 10/265 |
| 2004/0088925 | A1 | * | 5/2004 | Nozaki .................. B60J 10/248 49/498.1 |
| 2005/0034411 | A1 | | 2/2005 | Krause |
| 2013/0292965 | A1 | * | 11/2013 | Prater .................... B60J 10/265 296/146.2 |
| 2019/0210439 | A1 | * | 7/2019 | Williamson ........... B60J 10/265 |
| 2019/0359044 | A1 | * | 11/2019 | Roux ...................... B29C 45/14 |
| 2020/0086728 | A1 | * | 3/2020 | Roux ..................... B60J 10/248 |

FOREIGN PATENT DOCUMENTS

| | | | | |
|---|---|---|---|---|
| DE | 102010056385 | A1 | * 1/2012 | .............. B60J 10/76 |
| EP | 0021069 | A1 | 1/1981 | |
| EP | 0654371 | A1 | 5/1995 | |
| EP | 1500542 | A1 | 1/2005 | |
| WO | 03070501 | A1 | 8/2003 | |
| WO | 2010012095 | A1 | 2/2010 | |

OTHER PUBLICATIONS

European Office Action, Appl. No. 17 717 078.4 dated Jan. 29, 2021, 6 Pages.

* cited by examiner

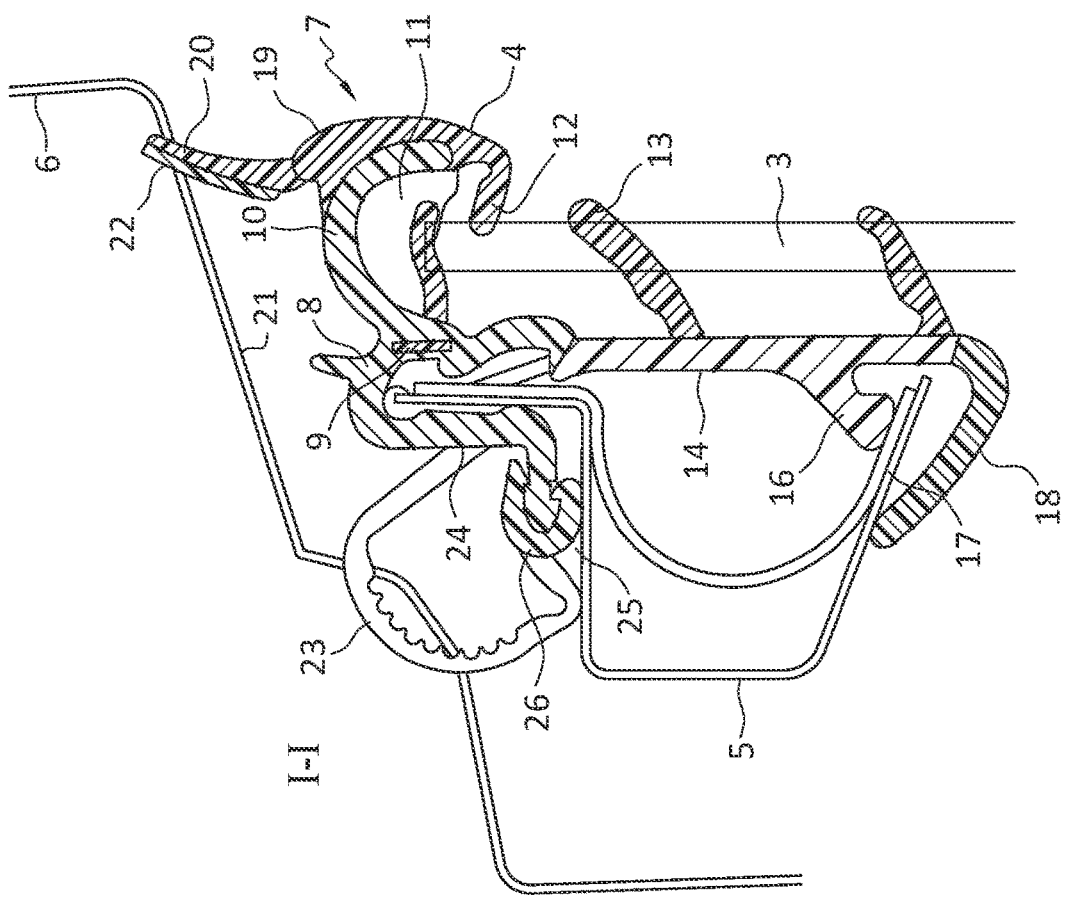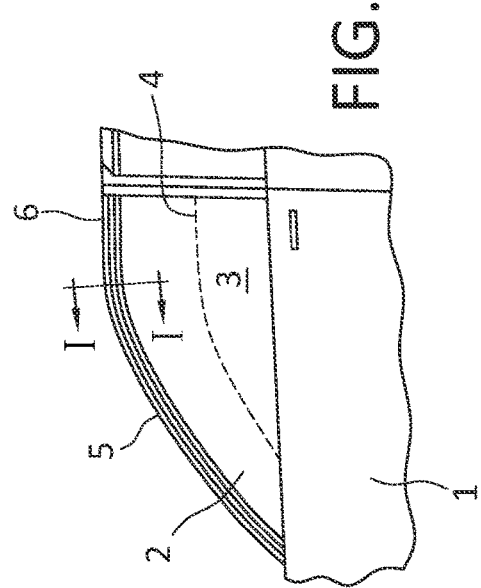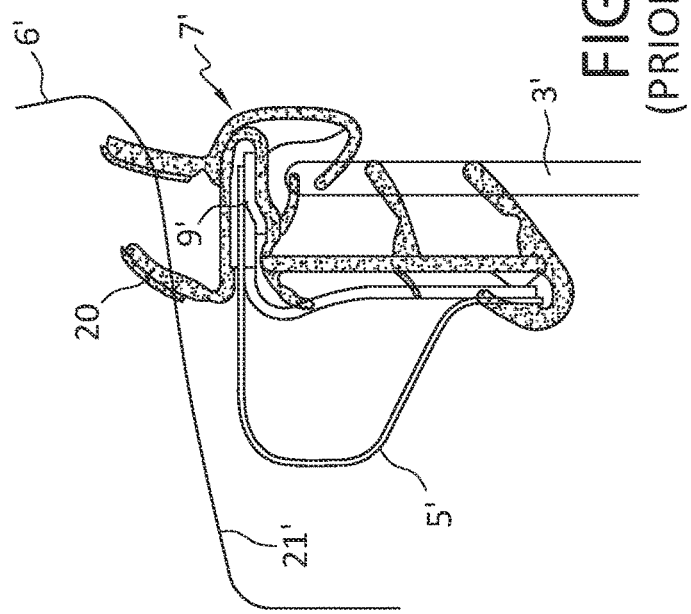

SEAL FOR A LOWERABLE WINDOW PANE OF A VEHICLE DOOR WINDOW

The present application is a 371 of International application PCT/EP2017/000372, filed Mar. 27, 2017, which claims priority of DE 10 2016 110 276.8, filed Jun. 3, 2016, the priority of these applications is hereby claimed and these applications are incorporated herein by reference.

BACKGROUND OF THE INVENTION

The invention relates to a seal between a frame part of a vehicle door window and the upper periphery of a lowerable window pane of the vehicle door window.

According to FIG. 4, known seals of this type comprise a seal profile 7' of EPDM or TPE material having a cross-sectional area that is illustrated in a punctiform manner in FIG. 4. The seal profile 7' is plug-fitted onto a flange 9' which projects from an upper frame part 5'(shown in the cross-section in FIG. 4) in a manner perpendicular to the plane of a lowerable window pane 3'. The seal profile 7' furthermore has seal lips 20' by way of which the upper frame part 5' is capable of being sealed in relation to a peripheral face 21' of a door opening in a vehicle body 6'.

SUMMARY OF THE INVENTION

In relation to said prior art, a new seal of the type mentioned at the outset, having a seal profile which, while providing a simplified construction of the upper frame part of the vehicle door window that receives the seal profile, is capable of being assembled in a positionally secured manner on the upper frame part with less complexity than conventional EPDM or TPE seal profiles and which moreover offers a significant saving in terms of material costs and weight is achieved by the present invention.

The seal profile of the seal according to the invention by way of a U-shaped fastening portion can be plug-fitted with little complexity onto the flange advantageously, wherein a bend of the upper frame part and a bend of the seal profile that corresponds to the profile of the flange can ensure that the seal sits securely on the flange. The seat does not permit any displacement of the seal profile in the longitudinal direction of the flange. The seal profile can thus advantageously also even form a door seal for which a separate seal profile is required according to the prior art.

In one preferred embodiment of the invention an external U-leg of the U-shaped fastening portion serves as an internal leg of a U-shaped groove portion that receives the upper periphery of the window pane, wherein said U-leg keeps the upper periphery of the window pane away from the vertically projecting flange of the upper frame part.

In a further advantageous design embodiment of the invention the inner leg of the U-shaped fastening portion is connected to the seal portion for forming a seal between the upper frame part and a peripheral face of a door opening in the vehicle body.

Said seal portion is preferably a tubular seal portion which in the case of a closed vehicle door adapts to a peripheral face of the door frame and bears in a sealing manner on the peripheral face of the door frame.

In one further embodiment of the invention a seal portion, in particular a seal lip, which ensures further sealing of the upper frame part of the vehicle door window in relation to the peripheral face of the door opening in the body extends upward from the upper end of the external U-profiled leg of the U-shaped groove portion.

In one particularly preferred embodiment of the invention the external U-leg of the fastening portion that forms the internal U-leg of the groove profile is extended downward in terms of length.

This extension at the free end thereof expediently has a trim strip portion that engages below the frame part. Apart from seal lips that bear on the window pane, installations, in particular a detent protrusion, for further connecting the seal profile to the frame leg can be attached to the extension at the side that faces away from the seal lips.

In a further design embodiment of the invention the external U-leg of the groove portion comprises a further trim strip portion.

In one further particularly preferred embodiment of the invention the seal profile is produced from various thermoplastics. It is understood that the fastening portion is produced from a particularly strong thermoplastic material, for example, which can assume the support functions and clamping functions that are required for said portion. By contrast, seal lips are produced from a flexible thermoplastic material, while trim strip portions are produced from a thermoplastic material that in a corresponding manner forms attractive surfaces.

In a further design embodiment of the invention the groove portion at least in part is formed from the strong thermoplastic material of the fastening portion such that said groove portion can absorb great forces that are transmitted by way of the upper periphery of the window pane.

The production of the seal profile is preferably performed by multiple extrusion and subsequent processing for bending the extruded product, such that seal profiles which are bent so as to correspond to the bend of upper frame parts and are capable of being assembled without bending are created.

The invention will be explained further hereunder by means of an exemplary embodiment and the appended drawings which refer to said exemplary embodiment. In the drawings:

BRIEF DESCRIPTION OF THE DRAWING

FIG. 1 shows an illustration explaining the arrangement of a seal according to the invention on a vehicle;

FIG. 2 shows a seal according to the invention in a cross-sectional view;

FIG. 4 shows a seal of the generic type according to the prior art.

DETAILED DESCRIPTION OF THE INVENTION

Figure 3:
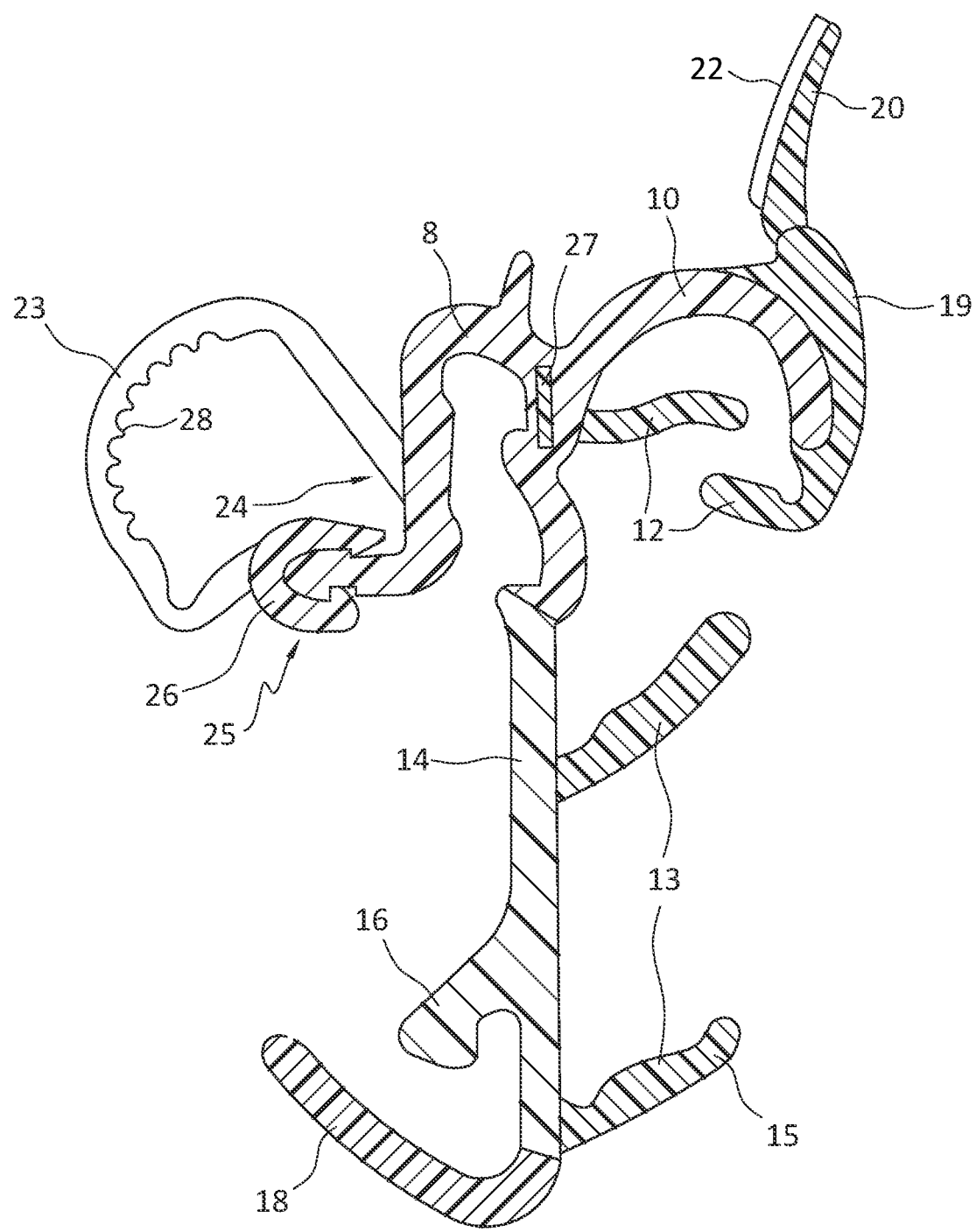
FIG. 3 shows a seal profile of the seal of FIG. 2.

A front vehicle door 1, shown in FIG. 1, having a window 2 has a lowerable window pane 3 which in the closed state of the window by way of the upper periphery 4 of said window pane 3 is sealed in relation to an upper frame part 5 of the window 2. There is further sealing between the upper frame part 5 and a peripheral face of the door opening in a vehicle body 6 (shown in fragments in FIG. 1), said door opening being closed by the vehicle door 1.

As can be derived from FIG. 2, a seal profile 7 which by way of a U-shaped fastening portion 8 is plug-fitted onto a flange 9 of the upper frame part 5 (shown in the cross section in FIG. 2) serves for sealing. The fastening portion 8 is composed of a strong thermoplastic material which can assume a supporting function for further profile portions as well as apply the clamping force that is required for fastening the seal profile 7 to the flange 9.

As is shown in FIGS. 2 and 3, the strong thermoplastic material of the U-shaped fastening portion 8 forms a substantial part of a further U-shaped profile portion, specifically of a groove portion 10 which forms a receptacle groove 11 for the upper periphery 4 of the window pane 3. The external U-leg of the U-shaped fastening portion 8 is a component part of both the fastening portion 8 as well as the U-shaped groove portion 10. Each of the U-legs of the U-shaped groove portion 10 has a seal lip 12, wherein the seal lips 12 are in each case composed of a thermoplastic material that is softer in relation to the strong thermoplastic material of the fastening portion 8.

Further seal lips 13 of such a soft thermoplastic material project from an extension 14 of the external U-leg of the U-shaped fastening portion 8, or from the internal U-leg of the U-shaped groove portion 10, respectively. The seal lips 12, 13 on that side thereof that faces the window pane 3 have an anti-friction coating 15 of a third thermoplastic material having suitable anti-friction properties.

The extension 14 per se in the example shown is composed of a fourth thermoplastic material which meets strength requirements that are reduced in relation to the thermoplastic material of the fastening portion 8. A detent 16 which serves for fastening the seal profile 7 to the upper frame part 5 and by way of which the seal profile 7 bears on a further flange of the upper frame part 5 projects on that side of the extension 14 that faces away from the seal lips 13.

A trim strip portion 18 which obscures the flange 17 of the upper frame part and is composed of a fifth thermoplastic material which forms a visually attractive visible face adjoins the extension 14 at the free end thereof. A further trim strip portion 19 that is composed of such a thermoplastic material is connected to the external U-leg of the groove portion 10 and moreover forms an end portion of said external U-leg.

A further seal lip 20 by way of which the upper frame part 5 is sealed in relation to a peripheral face 21 of the door opening in the vehicle body 6 upwardly adjoins the external U-leg. The seal lip 20 on that side thereof that faces the peripheral face 21 has an anti-friction coating 22 of a sixth thermoplastic material having special anti-friction properties in relation to paint. The seal lip 20 otherwise is composed of the same material as the seal lips 12, 13. The anti-friction coating 22 in the example shown is a layer of flocking.

The Internal U-leg of the U-shaped fastening portion 8 is connected to a tubular seal portion 23 which serves for further sealing the upper frame part 5 in relation to the vehicle body 6 and comes to bear on the peripheral face 21 of the door opening. The seal portion 23 is composed of a seventh thermoplastic material which is to a particular extent resistant to dynamic stresses.

The seal profile 7 which has been described above and which in the example shown has a curved shape so as to be adapted to the upper frame part 5 is produced by multiple extrusion and subsequent processing for bending the cooling extruded product, wherein the various profile portions that are composed of dissimilar thermoplastic materials are interconnected in a materially integral manner by being extruded to one another.

The wall of the tubular seal portion 23 is connected to the internal U-leg of the U-shaped fastening portion 8 in a materially integral manner only at 24, whereas a latched form-fitting connection is established at 25. The wall of the seal portion 23 is extruded onto the internal U-leg of the U-shaped fastening portion 8 and onto an end piece 26 which is likewise composed of the strong thermoplastic material of the U-shaped fastening portion 8. The form-fitting connection is necessary because an extruded tubular seal portion that has already been closed could no longer be subjected to any subsequent processing for bending. The wall of the tubular seal portion 23 by way of a region having notched grooves 28 across the tubular circumference is configured so as to be variably flexible in such a manner that a desired tubular shape is established in the production of the form-fitting connection 25.

The fastening portion 8, the groove portion 10, and the end piece 26 can be composed of the same hard thermoplastic material, for example PP ionomer, PP copolymer, or glass-fiber-reinforced PP.

A soft thermoplastic material having a hardness between 55 and 75A, for example TPV or TPS, can be considered in each case for the seal lips 12, 13, and 20.

The extension 14 having the detent 16 is preferably composed of a soft thermoplastic material having a hardness between 75 and 90 A.

A very soft thermoplastic material having a hardness between 35 and 50 A can be considered for the seal portion 23.

Both the extension 14 as well as the seal portion 23, like the seal lips 12, 13, 20, can have TPV or TPS as the basic material.

The trim strip portions 18 and 19 are composed of a material that forms a decorative and scratch-resistant surface, having a hardness between 55 and 90 A, for example of TPV, TPS, PP, PA, an alloy of PA and PP, or an ionomer.

27 refers to a metal insert which in the respective example is configured as an aluminum strip and which is embedded in the hard material of the fastening portion 8, or of the groove portion 10, respectively. The metal insert 27 serves for delimiting the thermal expansion of the seal profile 7 and in the example shown is disposed in a central region of the seal strand portion that is formed from the hard material.

The production process of the seal strand described above requires at least five different extrusion installations in order for the seal portions to be extruded onto one another. Six different extruders are preferably used.

The invention claimed is:

1. A seal between a frame part of a vehicle door window and the upper periphery of a lowerable window pane of the vehicle door window, comprising a seal profile made of various thermoplastic materials plug-fitted by a U-shaped fastening portion onto a flange that projects upward from the frame part of the vehicle door window, and connected to a tubular seal portion composed of a thermoplastic material for forming a seal between the frame part and a peripheral face of a door opening in a vehicle body, wherein the tubular seal portion has a wall with a first end connected to an internal U-leg of the U-shaped fastening portion in a materially integral manner and a second end where a latched form-fitting connection is established.

2. The seal according to claim 1, wherein the seal profile is plug-fitted onto the flange by a U-shaped fastening portion.

3. The seal according to claim 2, wherein the U-shaped fastening portion has an external U-leg that forms an internal U-leg of a U-shaped groove portion that forms a receptacle groove for the upper periphery of the window pane.

4. The seal according to claim 1, wherein the seal profile has a metal insert that delimits thermal expansion.

5. The seal according to claim 3, further having a seal portion that extends upward from an upper end of an external U-profiled leg of the U-shaped groove portion.

6. The seal according to claim 5, wherein the seal portion is a seal lip.

7. The seal according to claim 3, wherein the external leg of the fastening portion that forms the internal U-profiled leg of the groove portion has an extension downward in terms of length.

8. The seal according to claim 7, wherein a free end of the extension is connected to a trim strip portion that engages below the frame part.

9. The seal according to claim 7, wherein the extension has an installation for connecting to the frame part.

10. The seal according to claim 9, wherein the installation for connecting to the frame part is a detent protrusion.

11. The seal according to claim 9, wherein the extension has seal lips that seal the window pane, the seal lips being separate from the installation for connecting.

12. The seal according to claim 5, wherein the external U-leg of the groove portion has a trim strip portion.

13. The seal according to claim 1, wherein the fastening portion is composed of a single thermoplastic material, and at least in parts the groove portion is composed of the thermoplastic material from which the fastening portion is composed.

14. The seal according to claim 1, wherein the seal profile is formed by multiple extrusion and subsequent processing for bending the extruded product.

* * * * *